April 1, 1969     L. N. SAYER ET AL     3,436,515
ELECTRON BEAM WELDING
Filed Oct. 29, 1965

# United States Patent Office 3,436,515
Patented Apr. 1, 1969

3,436,515
ELECTRON BEAM WELDING
Lawrence Norman Sayer, Erdington, Birmingham, and Eric Clive Brown, Handsworth, Birmingham, England, assignors to Joseph Lucas (Industries) Limited, Birmingham, England
Filed Oct. 29, 1965, Ser. No. 505,637
Claims priority, application Great Britain, Dec. 11, 1964, 50,487/64
Int. Cl. B23k *15/00*
U.S. Cl. 219—121      3 Claims

ABSTRACT OF THE DISCLOSURE

Two thick workpieces are arranged in abutting relationship so as to define a joint line therebetween. The workpieces are provided with a pair of recesses along the joint line and including a material therebtween. The two workpieces are then butt welded by directing an electron beam along the joint line from opposite sides of the two workpieces as far as the recesses respectively such that the two welds formed by the respective electron beams are prevented from impinging onto one another. The material between the pair of recesses may either be part of the workpieces themselves or an additional material inserted along the joint line between the two workpieces.

---

This invention relates to a method of butt welding two components utilizing an electron beam.

The invention resides in a method of butt welding in which two recesses are defined along the joint line between the components, and the components are welded together by electron beam welding from opposite sides of the components as far as the recesses respectively, material being provided between the recesses for preventing or reducing the risk of the weld formed by one beam impinging on the weld formed by the other beam.

The material can be part of one or both components, or a separate piece.

FIGURES 4A and 4B, 5A and 5B, 6A and 6B, and 7A and 7B illustrate respectively four examples of the invention.

Figure 1:
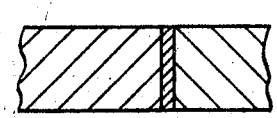
FIGURES 1 and 2 illustrate two known methods of welding.
Figure 2:
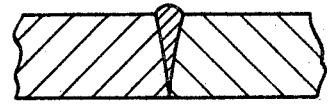
Figure 3A:
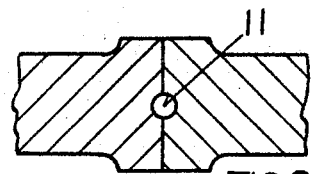
FIGURES 3A, 3B illustrate a further known method.

Referring to the drawings, FIGURE 1 shows a butt weld which is formed by an electron beam. This weld is satisfactory because the thickness of the components is well within the depth of penetration of the beam, but for thicker components the thickness of the weld decreases as shown in FIGURE 2, so that alignment is critical. An alternative proposal is to shape the components so that when they are abutting they define a recess 11 as shown in FIGURE 3A. Welding is then carried out in two stages from opposite sides of the components, the beam in each case penetrating into the recess and forming a weld as indicated in FIGURE 3B.

Figure 3B:
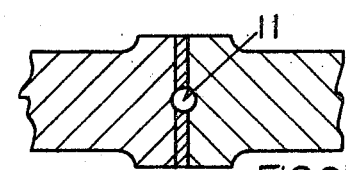
Figure 4A:
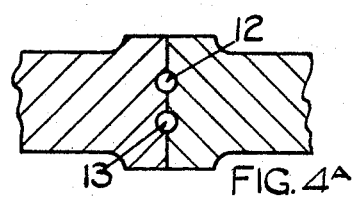
Figure 4B:
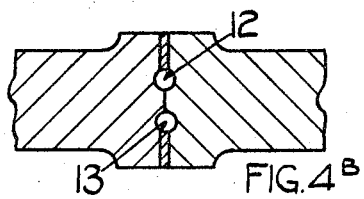
Figure 5A:
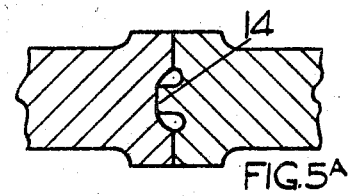
Figure 5B:
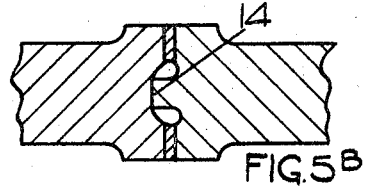
Figure 6A:
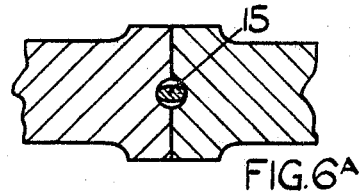
Figure 6B:
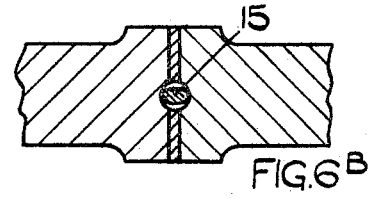
Figure 7A:
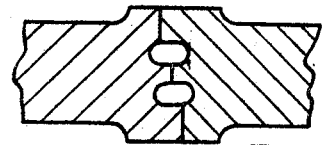
Figure 7B:
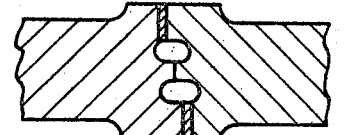

The technique described with reference to FIGURES 3A and 3B is not entirely satisfactory, because in spite of the recess the beams from opposite sides still impinge on the welds beyond the recess which is unacceptable. FIGURES 4 to 7 show examples of methods according to the invention for preventing or reducing the risk of such an occurrence.

In FIGURE 4, the components are shaped to define two grooves 12, 13 separated by abutting portions of the components. The material between the grooves will contain any defects due to impingement of the electron beams.

FIGURE 5 shows an alternative arrangement in which the material between the grooves is a tongue 14 on one of the components only. This arrangement is particularly useful where the component on which the tongue is formed is of a material which is easier to weld than the other component.

In FIGURE 6, the components define a single recess which is divided into two recesses by a separate piece 15 formed from material such, for example, as tungsten or copper, which will intercept excess penetration from the beam.

FIGURE 7 shows an example in which the weld lines from opposite sides are offset.

In the case of longitudinal welds, the methods described in FIGURES 4 to 7 could be employed without difficulty. In FIGURE 6, the separate piece could be trapped by the components or held by an external jig, and could be removed after the welding operation.

For circular welds, all the methods could be used, but in FIGURES 5 and 6 one of the components would have to be in two parts to permit assembly. In FIGURE 6, the additional piece could be sprung into position on one component, the other component being in two pieces, but the additional piece could not be removed.

Having thus described our invention what we claim as new and desire to secure by Letters Patent is:

1. A method of butt welding two thick components utilizing an electron beam, comprising the steps of defining two recesses along the joint line between the components, providing a material between the two recesses along the joint line for preventing the risk of the weld formed by one electron beam impinging onto the weld formed by an oppositely directed electron beam, and welding the two components by directing electron beams along the joint line from opposite sides of the two components as far as the recesses respectively.

2. A method as claimed in claim 1 in which said material is constituted by the material of the components.

3. A method as claimed in claim 1 in which said material is constituted by the material of a component which is separate from the two thick components being joined.

References Cited

UNITED STATES PATENTS

| | | | |
|---|---|---|---|
| 3,134,013 | 5/1964 | Opitz et al. | 219—121 |
| 3,151,231 | 9/1964 | Steigerwald | 219—121 |
| 3,185,815 | 5/1965 | Anderson | 219—121 |
| 3,230,339 | 1/1966 | Opitz et al. | 219—121 |

RICHARD M. WOOD, *Primary Examiner.*

W. DEXTER BROOKS, *Assistant Examinre.*